Patented June 5, 1951

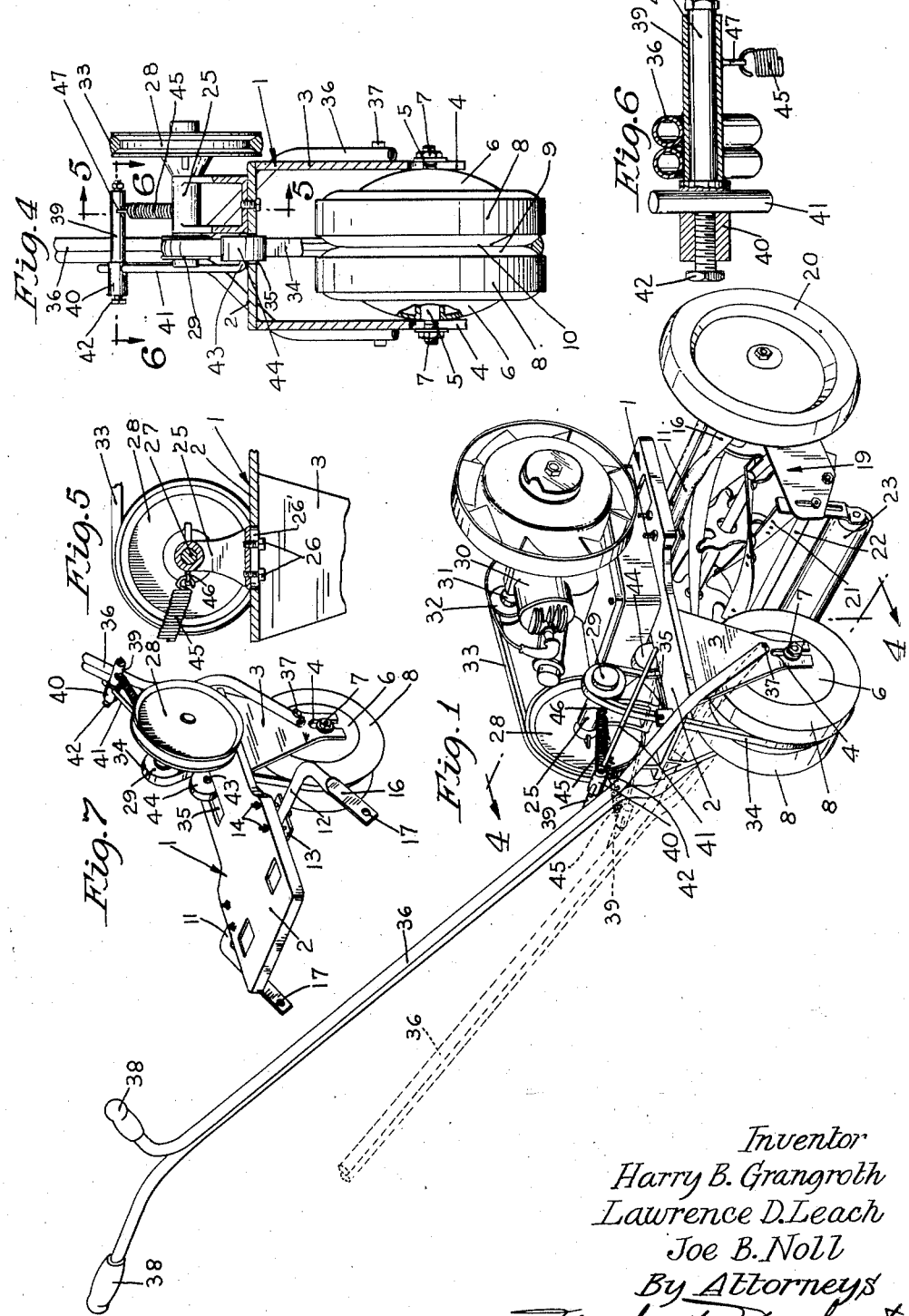

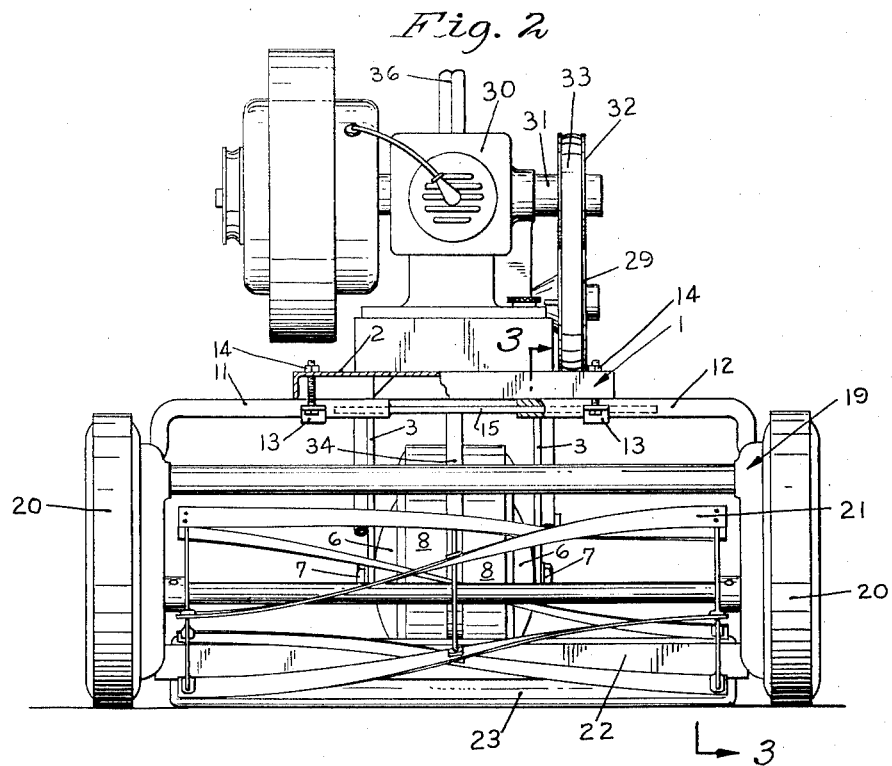
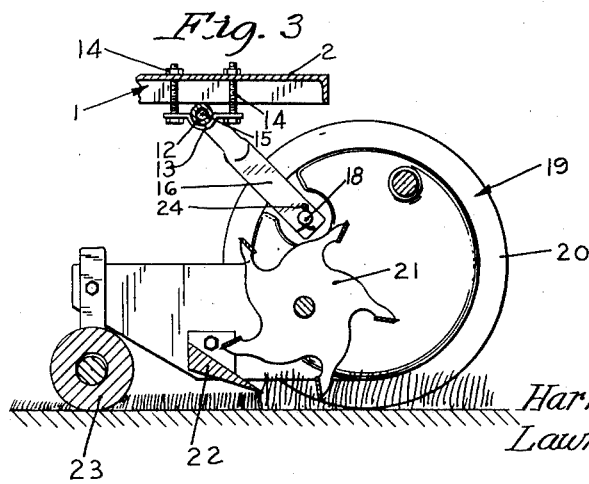

2,555,881

UNITED STATES PATENT OFFICE 2,555,881

DRIVING MECHANISM FOR VEHICLES

Harry B. Grangroth, Lawrence D. Leach, and Joe B. Noll, Minneapolis, Minn., assignors to Le Jay Manufacturing Co., Minneapolis, Minn., a firm Application August 19, 1948, Serial No. 45,114

3 Claims. (Cl. 180—19)

Our invention relates generally to propelling or driving mechanisms, and, more particularly, to a power driving mechanism adapted to be attached to vehicles, garden implements, and the like.

A highly important object of our invention is the provision of a driving mechanism which can be quickly and easily attached to a vehicle to be driven without necessitating structural changes in the vehicle.

Another object of our invention is the provision of means for attaching the drive mechanism to a vehicle wherein said means may be easily adjusted to vehicles of various widths.

A still further object of our invention is the provision of a drive mechanism having closely-spaced axially-aligned ground wheels, the tires of which cooperate to form a V-pulley whereby the ground wheels are driven.

Another object of our invention is the provision of a novel clutching arrangement incorporated in the driving connections between the motor of our device and the ground-engaging drive wheels thereof.

Another object of our invention is the provision of a drive mechanism as set forth which is inexpensive to build, which is easily attached to an implement such as a lawn mower or the like, and which is rugged in construction and efficient and durable in use.

The above and still further highly important objects and advantages of our invention will become apparent from the following detailed specification, appended claims, and attached drawings.

Referring to the drawings, in which like characters indicate like parts throughout the several views:

Fig. 1 is a view in perspective of our novel driving mechanism attached to a lawn mower;

Fig. 2 is an enlarged front elevation of the machine of Fig. 1, some parts being broken away and some parts shown in section;

Fig. 3 is a transverse section taken substantially on the line 3—3 of Fig. 2;

Fig. 4 is a fragmentary section taken substantially on the line 4—4 of Fig. 1;

Fig. 5 is a fragmentary section taken substantially on the line 5—5 of Fig. 4;

Fig. 6 is an enlarged fragmentary section taken on the line 6—6 of Fig. 4; and

Fig. 7 is a view in perspective of our novel driving mechanism or attachment with the motor thereof removed and some parts broken away.

Referring with greater detail to the drawings, the numeral 1 indicates in its entirety a frame comprising a normally horizontally-disposed platform 2 having a pair of laterally-spaced flanges 3 depending therefrom adjacent the rear end thereof. The lower ends of the flanges 3 are slotted as indicated at 4 to receive a shaft 5 on which are journalled a pair of driving wheels 6. The opposite ends of the shaft 5 are diametrically-reduced and threaded to receive washer-equipped clamping nuts 7 which, when tightened, clamp the shaft 5 in the desired position in the flanges 3. The wheels 6 are each provided with a pneumatic tire 8 and are disposed in an axially-spaced relationship wherein the side walls of the tire 8 abut one another. In this relationship, opposed side faces 9 of the tire 8 cooperate to form an annular V-groove 10, which functions as a V-pulley for a purpose which will hereinafter become apparent.

We provide means for attaching the frame to a wheeled vehicle, such as a lawn mower, said means being in the nature of a pair of tubular arms 11 and 12. Said arms 11 and 12 extend transversely of the frame 1 and are each rigidly secured to the platform 2 forwardly of the ground wheels 6 by means of clamping plates 13 and nut-equipped bolts 14. The arm 11 is axially-aligned with the arm 12 and has rigidly secured to its inner end, by means of welding or the like, an axially-projecting rod 15 which is telescopically received in the inner end portion of the arm 12 (see particularly Figs. 2 and 3). At their outer ends, the arms 11 and 12 are bent to form radially-extending portions 16 which are provided with apertures 17. The apertures 17 are adapted to receive handle-mounting trunnions 18 usually found on conventional lawn mowers. In the drawings, the lawn mower is indicated in its entirety by the numeral 19 and includes ground wheels 20, revolving cutter element 21, cutter blade 22, and roller 23. A cotter pin 24 prevents the trunnions 18 from becoming disengaged from the apertures 17. The arrangement immediately above described permits attachment of our novel drive mechanism to mowers or vehicles of different widths. This is accomplished by merely removing the handle of the mower, loosening the clamping plates 13, and moving the arms 11 and 12 transversely of the platform 2 until the trunnions 18 are received within the apertures 17. The clamping bolts 14 are then tightened whereby to maintain the arms 11 and 12 in the desired position. It will be noted that the arms 11 and 12 may be rotated when the clamping screws 14 are loosened so that the radially-projecting ends of the arms 11 and 12 may be raised or lowered to the height of the trunnions 18.

A bearing bracket 25 is rigidly secured to the rear end portion of the platform 2 by means of bolts or the like 26, and has journalled therein a jack shaft 27. The jack shaft 27 preferably overlies and is parallel with the drive wheel shaft 5. The shaft 27 extends axially outwardly of both ends of the bearing bracket 25 and has fast on one projected end thereof a relatively large pulley 28 and at its other projected end a relatively small pulley 29. A motor or internal combustion engine 30 is mounted fast on the forward end of the platform 2 and has secured fast on the drive shaft 31 thereof a pulley 32. The pulleys 28 and 32 are preferably of the V-type and have running thereover a V-belt 33. It will be noted by reference to Fig. 5 that the bolts 26 pass upwardly through a slot 26' in the platform 2 to enable the bearing bracket 25 to be shifted toward and away from the engine 30 so that the V-belt 33 may be maintained under proper tension.

Running over the relatively small V-pulley 29 and the V-groove 10 formed by the opposed side faces 9 of the tires 8 is a V-belt 34. The length of the belt 34 and the spacing of the pulley 29 and tires 8 is such that the belt 34 normally runs very loosely over the pulley 29 and V-groove 10. In fact, the looseness of the belt 34 permits the pulley 29 to rotate without engaging the belt 34 to drive the same. Obviously, and as shown in Fig. 4, the pulley 29 lies in a plane extending transversely through the shaft 5 intermediate the wheels 6 and the belt 34 passes through a rectangular opening 35 in the platform 2.

Provision is made for causing the V-belt 34 to operatively frictionally engage the pulley 29 and V-groove 10 as follows: A handle bar 36 is bifurcated at its lower end and hingedly connected to the flanges 3 of the frame 1 as indicated at 37. The handle bar 36 inclines rearwardly from the frame 1 and terminates at its upper end in a pair of hand grips 38. Intermediate its ends, the handle bar 36 has secured thereto, by welding or the like, a transversely-extended sleeve 39 in which is pivotally secured a pintle pin or shaft 40. A rigid link 41 is transversely slidable in one end portion of the shaft 40 and is held against sliding movements therein by a set screw or the like 42. The link 41 extends forwardly and downwardly to a point slightly forward and below the pulley 29, where it is bent at a right angle to form a stub shaft 43. An idler pulley 44 is journalled on the stub shaft 43 and lies in the plane of the pulley 29 and the V-groove 10, and, as shown in Figs. 4 and 7, lies partly within the aperture 35 of the platform 2. It will be seen by reference to the full line position in Fig. 1 of the handle bar 36 that the belt 34 loosely engages the pulley 29. When the handle bar 36 is moved to its dotted line position of Fig. 1, the idler pulley 44 is moved rearwardly by the link 41 whereby to take up the slack in the belt 34 and cause it to operatively engage the pulley 29 and the opposed side faces 9 of the tires 8. A coil tension spring 45 has one end anchored to the bearing bracket 25, as indicated at 46, and its other end secured to the sleeve 39, as indicated at 47. The spring 45 biases the handle bar 36 toward its full line position of Fig. 1 to automatically decrease or eliminate altogether frictional engagement of the pulley 29 with the belt 34. Hence, moving of the handle bar 36 to its dotted line position of Fig. 1 must be accomplished against bias of the spring 45 and the handle bar 36 must be held in the lowered position for the duration of the operation of the drive. Obviously, when it is desired to stop the vehicle it is but necessary for the operator to release his hold upon the hand grips 38 whereby to allow the bias of the spring 45 to pull the handle bar 36 to its full line position of Fig. 1 and move the idler pulley 44 out of tightening engagement with the V-belt 34. The proper amount of slack to be initially imparted to the belt 34 is determined by the position of the shaft 5 with respect to the jack shaft 27. As seen in Fig. 4, this adjustment is made by merely moving the wheel-mounted shaft 5 upwardly or downwardly in the slots 4 and clamping the same in the desired position by tightening the nuts 7.

Our novel attachment has been found to perform very adequately when connected to a lawn mower as shown. The device may be just as readily attached to other garden implements such as small cultivators and the like, and also to any other vehicle, such as a small wagon or sled.

While we have shown and described a single embodiment of our device, it will be understood that the same is capable of modification without departing from the spirit and scope of the invention as defined in the claims.

What we claim is:

1. In a device of the class described, a supporting frame adapted to receive a motor adjacent its front end, a pair of closely-spaced axially-aligned pneumatic tire-equipped ground wheels adjacent the rear end of said frame, a transversely-disposed jack shaft journalled on said frame, driving connections from said motor to said jack shaft, a pulley on said jack shaft, said pulley being in a vertical plane extending transversely of the axis of said wheels and intermediately thereof, a belt running over said pulley and opposed side faces of said tires, means associated with said frame forwardly of said ground wheels for securing said frame to a wheel-equipped vehicle, a rearwardly-inclined handle bar pivotally secured at its lower end to said frame, and means associated with said handle bar for increasing frictional contact between said belt and said pulley and tires when said handle bar is pivotally moved in one direction and decreasing frictional contact of said belt with said pulley and tires when said handle bar is pivotally moved in the opposite direction whereby to allow said pulley to rotate independently of said ground wheels.

2. In a device of the class described, a supporting frame adapted to receive a motor adjacent its front end, a pair of closely-spaced axially-aligned pneumatic tire-equipped ground wheels adjacent the rear end of said frame, a transversely-disposed jack shaft journalled on said frame, driving connections from said motor to said jack shaft, a pulley on said jack shaft, said pulley being in a vertical plane extending transversely of the axis of said wheels and intermediately thereof, a belt running over said pulley and opposed side faces of said tires, means associated with said frame forwardly of said ground wheels for securing said frame to a wheel-equipped vehicle, a rearwardly-inclined handle bar pivotally mounted at its lower end to said frame, a rigid link having one end pivoted to said handle bar intermediate the ends thereof, an idler pulley journalled to the other end of said link and adapted to engage said belt whereby to increase frictional engagement of said belt with said pulley and tires when said handle bar is moved in one direction and decrease frictional engagement of said belt with said pulley and tires when said handle bar is moved in the opposite direction.

3. The structure defined in claim 2, in further combination with spring means biasing said handle bar and idler pulley in a direction to decrease frictional engagement of said belt on said pulley and tires, whereby to allow said pulley to rotate independently of said ground wheels.

HARRY B. GRANGROTH.
LAWRENCE D. LEACH.
JOE B. NOLL.

REFERENCES CITED

The following references are of record in the file of this patent:

UNITED STATES PATENTS

| Number | Name | Date |
| --- | --- | --- |
| 460,375 | Higgins et al. | Sept. 29, 1891 |
| 1,357,396 | Gater | Nov. 2, 1920 |
| 1,461,716 | Blackmore | July 10, 1923 |
| 1,479,092 | Springer | Jan. 1, 1924 |
| 1,657,514 | Miller | Jan. 31, 1928 |
| 2,066,174 | Cregier | Dec. 29, 1936 |
| 2,070,288 | Mack | Feb. 9, 1937 |
| 2,151,659 | Fenk | Mar. 21, 1939 |
| 2,238,707 | Ronning | Apr. 15, 1941 |
| 2,285,230 | Robertson | June 2, 1942 |
| 2,426,342 | Couse | Aug. 26, 1947 |